United States Patent [19]

Mercier

[11] Patent Number: 4,516,046

[45] Date of Patent: May 7, 1985

[54] CONTINUOUS CURRENT ELECTRIC MACHINE WITH CYLINDRICAL AIR GAP AND PERMANENT MAGNET POLE PIECE

[75] Inventor: Rene Mercier, Dijon, France

[73] Assignee: CEM Compagnie Electro-Mecanique, Paris, France

[21] Appl. No.: 659,031

[22] Filed: Oct. 9, 1984

Related U.S. Application Data

[63] Continuation of Ser. No. 404,409, Aug. 2, 1982, abandoned.

[30] Foreign Application Priority Data

Aug. 6, 1981 [FR] France ............................. 81 15289

[51] Int. Cl.³ ............................................. H02K 21/26
[52] U.S. Cl. ................................. 310/154; 310/186; 310/216
[58] Field of Search ............... 310/154, 181, 185, 186, 310/216

[56] References Cited

U.S. PATENT DOCUMENTS

| | | | |
|---|---|---|---|
| 1,422,154 | 7/1922 | Watson | 310/154 |
| 3,671,787 | 6/1972 | Herron | 310/154 |
| 3,840,763 | 10/1974 | Baumann et al. | 310/156 |
| 4,150,312 | 4/1979 | Armstrong et al. | 310/154 |
| 4,217,513 | 8/1980 | Kohzai et al. | 310/154 |
| 4,358,696 | 11/1982 | Liu et al. | 310/156 |
| 4,358,697 | 11/1982 | Liu et al. | 310/156 |

*Primary Examiner*—R. Skudy
*Assistant Examiner*—Anita M. Ault
*Attorney, Agent, or Firm*—Burns, Doane, Swecker & Mathis

[57] ABSTRACT

A continuous current electric machine with a cylindrical air gap and with permanent magnet stator excitation in which stacked sheets forming the stator of the continuous current machine have closed cut-outs of a polygonal contour extending therethrough such that each closed cut-out extends into the immediate proximity of at least one of two ends of an effective region of a pole forming the air gap and leaves only a very narrow strip of the sheet between the cut-out and the air gap. At least one magnetic plate, preferably of a rare earth, is inserted in each cut-out to thereby form a permanent magnet pole. Each cut-out comprises a series of rectangular slots in the shape of a V or a U, the opening of which is oriented toward the corresponding effective region of a pole. One embodiment includes at least one wound pole formed on the stacked sheets so as to equip the electric machine with a hybrid, permanent magnet and wound inductor.

7 Claims, 5 Drawing Figures

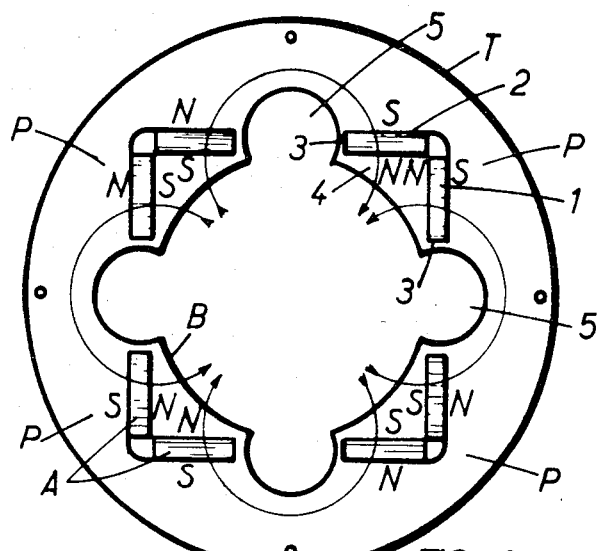
FIG.:1
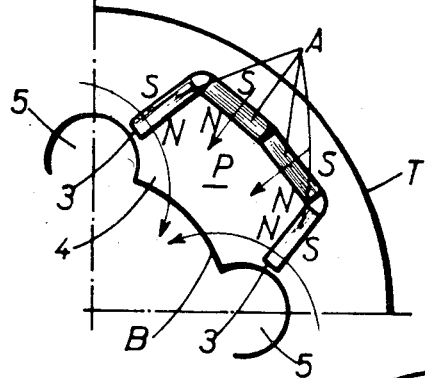
FIG.:3
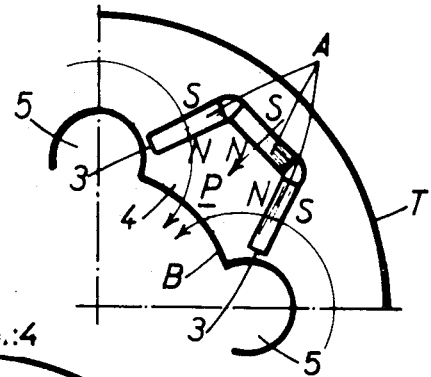
FIG.:2
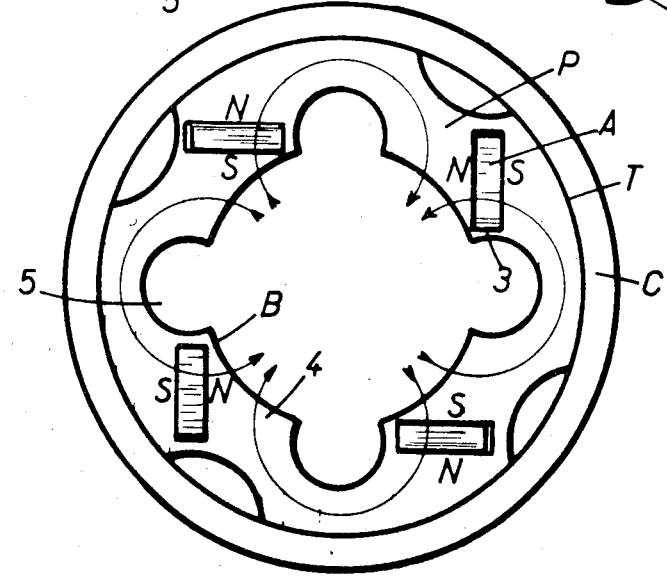
FIG.:4

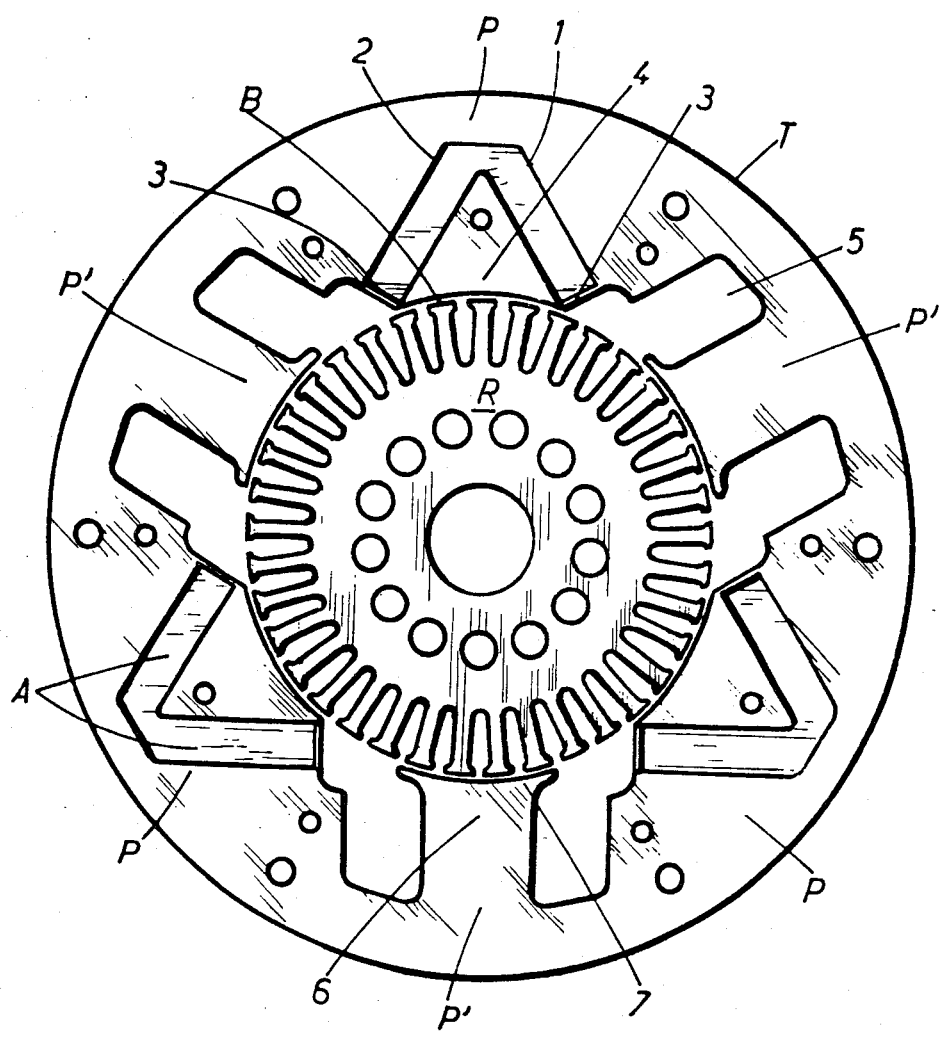
FIG.:5

CONTINUOUS CURRENT ELECTRIC MACHINE WITH CYLINDRICAL AIR GAP AND PERMANENT MAGNET POLE PIECE

This application is a continuation of application Ser. No. 404,409, filed Aug. 2, 1982, now abandoned.

BACKGROUND OF THE INVENTION

The present invention relates to a continuous current, high performance electric machine, with a cylindrical air gap and excitation by means of permanent magnets, based advantageously but not necessarily on rare earths and specifically on samarium-cobalt, and additionally to such a machine with both permanent magnet and would poles on the stator assembly.

Rare earth magnets have magnetic properties which are highly superior to those of conventional magnets, and therefore continuous current motors equipped with such magnets are capable of attaining a very high performance. On the other hand, the use of such magnets presents numerous disadvantages, such as the difficulty in producing "tiles" or pieces bent into the exact shape of the pole, the fragility of such pieces, the delicate nature of their installation and in situ magnetization.

OBJECTS AND BRIEF SUMMARY OF THE INVENTION

Because of the foregoing disadvantages, the use of juxtaposed rectangular plates is called for; they are of a simple geometric configuration and less expensive.

According to the present invention, these magnetic plates are housed in cut-outs of a closed, polygonal configuration provided in a stack of stamped sheets forming the stator of the continuous current machine, with the cut-outs leaving at their end adjacent to the air gap a very narrow strip only, which consequently is not able to short circuit the useful magnetic inductor flux.

It is of interest to note incidentally that such a small material reserve would be defective in the case of the rotor of an electric machine, due to the mechanical stresses generated by the centrifugal force.

Experiments conducted with electric motors having such a stator inductor showed that while the maintenance of a high constant magnetic flux results in satisfactory operation up to velocities of the order of 3000 rpm, this is no longer true at higher velocities due to the excessive heating of the armature as the result of a strong increase in iron losses in the sheets of the rotor, such iron losses being functions of rotor velocity and of magnetic flux magnitude. The efficiency then decreases rapidly and furthermore the potential between the collector segments may become prohibitive at a high velocity because, at a constant flux, an increase in velocity is obtained by increasing the armature voltage.

The present invention therefore has the further object of providing an improved variant of the above defined inductor stator which:

retains in the range of low velocities (for example from 0 to approximately 3000 rpm), the advantages of a high flux motor (constant and large torque), makes it possible to attain high velocities (for example 6000 rpm) without a prohibitive increase in iron losses and supply voltage (in the range from 3000 to 6000 rpm, operation may be at constant power), maintains high efficiency regardless of rating.

For this purpose and according to the improvement set forth, one or several permanent poles comprised of magnetic plates housed in gaps, (cut-outs) are replaced by a conventional wound pole so as to equip the electric machine with a hybrid inductor which advantageously may have an alternating succession of permanent magnet poles and wound poles forming a regular polar distribution, in keeping with a known method, described in particular by the French patent of Bignon, No. 1,407,904 of June 28, 1965.

This hybrid inductor renders it possible, by virtue of its wound pole or poles providing a capability of ampere-turns variations, to reduce the flux in the critical range of high velocities, thereby eliminating—or at least reducing appreciably—the above-mentioned disadvantages, with the presence of permanent poles together with that of wound poles, permitting the reduction of losses due to excitation, they being limited to the latter.

Various embodiments of the invention will become more apparent from the description hereinafter and the drawings attached hereto, with the description being given as a nonlimiting example.

BRIEF DESCRIPTION OF THE DRAWINGS

FIG. 1 is a schematic plane view of an inductor stator of a quadripolar motor, laid out according to one embodiment of the present invention;

FIGS. 2, 3 and 4 are similar views illustrating respectively three variant embodiments within the scope of the present invention;

FIG. 5 is a schematic plane view of a stamped sheet of the stack of sheets forming the stator according to a preferred hybrid embodiment of the present invention, with the sheet shown in position around the rotor of the electric motor.

DETAILED DESCRIPTION

An inductor stator, in the different embodiments shown in FIG. 1 to 4, is associated with an electric motor with four poles P and includes the usual stack of sheets T, made of a magnetic metal stamped in the general shape of a crown, the inner rim B whereof defines the outer edge of a cylindrical air gap which has an inner edge defined by the rotor (not shown) of the electric machine.

According to the present invention, a plurality of cut-out portions is provided in the sheets T to house a juxtaposition of permanent magnets A, consisting of rectangular magnetic plates which generate the magnetic induction flux of the machine. The different variants shown differ from each other by the geometric configuration of the cut-outs.

In the embodiment of FIG. 1, each of the four stator poles P of the motor has, along its axis, a cut-out portion in the shape of a V, the angle of which opens in the direction of the rim B of the air gap, with the more or less orthogonal branches of the V being formed by two rectangular slots 1, 2 joined at the apex of the V and ending in the immediate proximity of the rim B of the air gap, leaving only very narrow strips 3, 3 of the material of the sheet T. The width of each slot 1, 2 is essentially equal to that of the magnetic plates A located therein.

The successive poles P are separated by deep grooves 5 defining geometrically the neutral zones and restricting the passage of interpolar magnetic leakage fluxes.

A certain number of sheets T stamped in this manner is stacked and maintained with respect to each other by any suitable means to form a pack of stator iron. The alignment of the slots 1, 2 then constitutes, in each pole P, two slots into which the plates of the magnets A are introduced, preferably already magnetized, so that the faces turned toward the air gap are of the same polarity, in order to form a pole of the same magnetic sign or polarity at the effective region or "pole shoe" 4 of the pole, with the consecutive poles along the air gap being of alternating polarity.

It should be noted that the constrictions constituting the strips of material 3 of a very narrow width force the magnetic flux generated by the magnetic plates A to pass essentially through the pole shoes 4 and the air gap, i.e., along the working path shown by the arrows, without obtaining substantial short circuiting in the material of the sheets T. An elementary calculation of the strength of materials establishes the fact that such a small material reserve at 3 is possible only in the case of stator immobility, in the absence of any centrifugal force.

It should be noted further that the total linear extent of the slots 1, 2 filled by the magnetic plates A is substantially greater than the extent of the pole shoe 4 (the effective polar region) bordering the air gap and that consequently there is an active magnetic surface much larger than the effective surface of the air gap and an appreciable effect of concentration of the magnetic flux making it possible to obtain higher values of induction in the air gap. This effect of flux concentration becomes more pronounced since the path from the magnetic slots 1, 2 to the pole shoe 4 occurs over an area of decreasing radii, as the result of the outside location of the stator with respect to the air gap. This same decreasing radii relationship is obviously not true for the case of the rotor (not shown) which, being located on the inside (again with respect to the air gap), will find the path in question occurring over an area of increasing radii.

It is not absolutely necessary to fill all of the slots 1-2 with magnetic plates A and it is readily possible, if it is desired to appreciably reduce the cost of the machine, to fill with magnetic plates only the slots of one pole in two and to substitute an iron fill for the next pole.

Conversely, it is possible to increase the effective length of the gaps by constituting them of more than the two slots 1, 2 of FIG. 1.

Thus, FIGS. 2 and 3 show, respectively, variants of three and four consecutive slots each with a polygonal contour and together formed in the shape of a U, always opening in the direction of the rim of the air gap B and leaving in place only very narrow strips 3, 3 in the stator sheets T.

FIG. 4 shows an economical variant to provide small size motors with a single magnetic plate A per pole P, thicker than the preceeding thin plates, but still less costly than two thin plates. In this case, the optional casing C must be made of a nonmagnetic material.

A further improvement shown in FIG. 5 is a hybrid stator inductor as described initially hereinabove.

Thus again in this FIG. 5 embodiment there are found the permanent poles P (here they number three and are at 120° from each other), obtained by the stacking of identical stamped sheets T defining, together with the rotor R, the cylindrical air gap B. As before, each permanent pole P has along its axis a cut-out portion in the shape of a V, opening toward the air gap B, with the branches of said V being formed by two rectangular slots 1, 2 joined at the apex of the V and ending in the immediate proximity of the air gap B, leaving in place only the very narrow strips 3, 3 of the material in the sheet T at the ends of the pole shoes 4, bordered by the interpolar grooves 5. Magnetic plates A generating the permanent magnetic flux of the motor, are located in the slots 1, 2.

Wound poles P' (windings not shown) are interspaced between the permanent poles P, in keeping with the improvement intended.

For this reason, each of the stamped sheets T comprises, in addition to the polygonal slots 1, 2 for the housing of the permanent magnets A as described hereinabove, also the polar teeth 6, each equipped with an effective polar region or "pole shoe" 7, which after stacking will constitute the pole cores of wound poles P'.

The inductor may contain, in keeping with the intended operation, one or several wound poles P'. In the example shown in FIG. 5, the motor has six poles, which are alternatingly permanent P and wound P'.

The excitation of the wound poles P' creates a flux which is generally added to the flux generated by the permanent magnets A, but which may also be zero or even subtractive to reduce the total flux on the rotor R.

More precisely, the excitation of the wound poles P' is controlled in accordance with the rotating velocity of the motor, which may be divided into three ranges:

1. For low velocities (for example 0 to 3000 rpm), the operation is with a constant torque and the ampere-turns of the wound poles P'—which are additive with respect to the permanent poles P—are maintained at a maximum in order to obtain a minimum armature current. The velocity of the motor is then varied as a function of the voltage applied to the rotor via the collector or commutator.

2. For higher velocities (for example from 3000 to 5000 rpm), which cannot be attained by increasing the supply voltage because of sparking at the commutator and a reduction in efficiency, the operation is at constant power while reducing progressively the flux by reducing the ampere-turns of the wound poles P' from their maximum (for example at 3000 rpm as indicated under 1 above) to zero (for example at 5000 rpm).

3. For very high velocities (for example from 5000 to 6000 rpm), the motor operates always at a constant power, but the ampere-turns of the wound poles P' are inverted or reversed in order to subtract them from the flux generated by the permanent poles P. Obviously, it is not possible to continue indefinitely this inversion of the ampere-turns of the wound poles P', because of the risk of demagnetizing the permanent poles P.

The control of the ampere-turns of the wound poles P' described hereinabove (maintenance of their maximum value additively in a first range of low velocities, decrease to nullification in a second range of intermediate velocities and inversion of direction to render them subtractive in a third range of high velocities) is readily effected by means of conventional approaches for the control of the stator excitation current, e.g., beginning with a conventional tachymetric dynamo furnishing a velocity signal for excitation current control and to a threshold detector controlled by the transition velocity desired (3000 rpm in the example considered).

The hybrid induction motor P-P' described hereinabove with respect to FIG. 5 has the following appreciable advantages:

optimization of functioning in an enlarged range of velocities;

ease of regulation of the flux by the control of the excitation current as a function of the velocity desired;

elimination of the risk of the racing of the motor if by accident the excitation current of the wound poles P' is lost;

improved efficiency compared to conventional solutions, as only part of the stator poles are wound (reduction of excitation losses).

It is evident that the above-described modes of embodiment are merely examples and that they may be modified, in particular by the substitution of technical equivalents, without departing from the scope of the invention.

What is claimed is:

1. A continuous current electric machine with a cylindrical air gap and with permanent magnet stator excitation comprising:

a plurality of stacked sheets of magnetic metal forming the stator of the continuous current machine, said sheets having closed cut-outs of a polygonal contour extending therethrough such that the magnetic material completely surrounds each cut-out, and grooves separating adjacent cut-outs from one another and defining poles in the sheets, the polygonal contour of each closed cut-out extending into the immediate proximity of at least one of two ends of an effective region of a pole forming the air gap and leaving only a very narrow strip of the magnetic sheet material between the cut-out and the air gap; and at least one magnetic plate for insertion in each cut-out to thereby form a permanent magnet pole.

2. An electric machine according to claim 1, wherein each cut-out comprises a series of rectangular slots in the shape of a V or a U, the opening of which is oriented toward the corresponding effective region of a pole.

3. An electric machine according to claim 1 or 2, wherein the plate in each cut-out is of a rectangular shape.

4. An electric machine according to claim 1 or 2, wherein said permanent magnet pole comprises a first pole and further including at least one second pole comprising a wound pole formed on said stacked sheets so as to equip the electric machine with a hybrid inductor.

5. An electric machine according to claim 4, wherein the hybrid inductor comprises an alternating succession of permanent magnet poles and wound poles with a regular polar distribution.

6. An electric maching according to claim 4, wherein each sheet forming the stator is stamped so as to have, in addition to the cut-outs of polygonal configuration for receiving the permanent magnets, a plurality of polar teeth each provided with a pole shoe which, after stacking, constitutes the pole core of a wound pole.

7. An electric machine according to claim 5, wherein each sheet forming the stator is stamped so as to have, in addition to the cut-outs of polygonal configuration for receiving the permanent magnets, a plurality of polar teeth each provided with a pole shoe which, after stacking, constitutes the pole core of a wound pole.

* * * * *